United States Patent Office 2,694,079
Patented Nov. 9, 1954

2,694,079

DEHYDROHALOGENATION PROCESS

Roman P. Holysz, Kalamazoo, Mich., assignor to The Upjohn Company, Kalamazoo, Mich., a corporation of Michigan No Drawing. Application April 18, 1952,
Serial No. 283,130

19 Claims. (Cl. 260—397.45)

The present invention relates to a dehydrohalogenation process and is more particularly concerned with a novel process for the dehydrohalogenation of certain α-haloketosteroids to produce α,β-unsaturated keto-steroids.

It is an object of the present invention to provide a novel process for the dehydrohalogenation of α-haloketosteroids. A further object of the invention is the provision of a process whereby an α-haloketone group, which is part of a steroid nucleus, is converted to an α,β-unsaturated ketone group. Other objects of the invention will be apparent to those skilled in the art to which this invention pertains.

According to the process of the present invention an α-haloketone group, which is part of the nucleus of a steroid, is converted to an α,β-unsaturated ketone group. The α,β-unsaturated ketone group (e. g., Δ⁴-3-keto) is an essential part of the nucleus in most of the steroid hormones. Such physiologically active steroid hormones as cortisone, progesterone, testosterone, and others, contain an α,β-unsaturated ketone system as an integral part of the nucleus. One of the major problems in the synthetic approach to these hormones has been the establishment of the α,β-unsaturated ketone system in the A ring of the steroid nucleus. In solving this problem the main approach has been to halogenate a 3-keto steroid in the 4-position and then to remove hydrogen halide from the 4(5)-position and form a 4(5)-double bond. Of the many schemes devised for removal of the hydrogen halide, only two have been of any practical use. One of these methods, that involving treatment of the α-haloketo-steroid with a base such as pyridine or collidine, generally gives low yields and the products are difficult to isolate. The newer method, of Kendall and co-workers, involves treatment of the α-haloketo-steroid with semicarbazide or 2,4-dinitrophenylhydrazine to form the ketone derivative and at the same time eliminate hydrogen halide. The ketone is then regenerated by removal of the azone moiety through an exchange reaction with an active carbonyl compound such as pyruvic acid. This method, although it gives better yields than the pyridine method, has the obvious disadvantage of involving two steps to accomplish the removal of hydrogen halide. In addition, the reagents used are comparatively very expensive. According to the present invention, a novel one step process is provided whereby the removal of hydrogen halide from an α-haloketo-steroid, and isolation of the α,β-unsaturated keto-steroid product, is accomplished with ease of manipulation and in excellent yields.

Starting materials for the method of the present invention are steroid compounds which contain, as part of the carbon chain of the nucleus, an α-haloketone grouping represented by the formula:

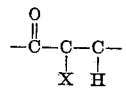

wherein X represents a chlorine or a bromine atom. The two carbon atoms bearing the halogen and the hydrogen in the above formula are here referred to as being "vicinal" to the ketone group. Any steroid compound possessing the requisite α-haloketone grouping as part of its nucleus is suitable as starting material for the process of the present invention. The nucleus may have other substituents such as, for example, ketone, hydroxy, acyloxy, carboxy, carbalkoxy, and the like, attached to one or more of the carbon atoms of the nucleus. In addition the nucleus may contain double bonds. The side-chain at the 17-position of the nucleus, if a side-chain is present, may be any one of the natural side-chains such as, for example, those found in the sterols, bile acids, and pregnanes, or any of the various substitution and degradation modifications of these side-chains.

Representative steroid compounds which may be employed in the process of the present invention are, for example, 4 - bromo - 17α - hydroxy - 21 - acetoxypregnane-3,11,20 - trione, 4 - bromo - 17α,21 - dihydroxypregnane-3,11,20 - trione, 4 - chloro - 17α - hydroxy - 21 - acetoxypregnane-3,11,20-trione, 4-chloro-11β,17α-dihydroxy-21-acetoxypregnane-3,20-dione, 4-bromo-11β,17α,21-trihydroxypregnane-3,20-dione, 4-bromopregnane-3,11,20-trione, 2,4-dibromoandrostane-17β-ol-3-one, 4-bromopregnane-3,20-dione, methyl 3-keto-4-bromo-12-acetoxyetiocholanate, 4-bromocoprostanone, 2-bromocholestanone, 6-bromo-7-ketocholanic acid, 3α-acetoxy-11-bromo-12-ketocholanic acid, and the like.

According to the method of the present invention, reaction of a steroid compound containing as part of the carbon chain of the nucleus, an α-haloketone grouping represented by the formula:

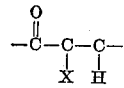

wherein X represents a chlorine or a bromine atom, with a metal halide in the presence of a basic organic solvent results in the elimination of hydrogen chloride or hydrogen bromide to form a double bond and give an α,β-unsaturated ketone group represented by the formula:

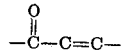

In carrying out the process of the present invention, an α-haloketo-steroid and a metal halide are dissolved in a basic organic solvent and the solution is heated until dehydrohalogenation is complete. The time required for completion of the reaction may vary from a few minutes to about 24 hours or more and is dependent to a large extent on the temperature employed. Temperatures of about thirty degrees centigrade to about 200 degrees centigrade, preferably thirty to 150 degrees centigrade, are operative, with the optimum conditions being a reaction period of about two to three hours at a temperature of about 100 degrees centigrade when operating in a batchwise manner. The time-temperature relationship of the reaction is more clearly demonstrated in Example 18. Although the preferred amount of metal halide employed is usually in a ratio of one mole of steroid to about three moles of the metal halide, amounts from a trace of metal halide to ratios of twenty moles or more of the metal halide to one mole of steroid are operative.

Sometimes an acid catalyst is added to the reaction mixture to enhance the yield of product. For this purpose paratoluenesulfonic acid, napthalenesulfonic acid, sulfuric acid, and the like, may be used. Para-toluenesulfonic acid is usually the preferred acid catalyst for this purpose.

If desired, the course of the reaction can be easily folowed by removing aliquots at different time intervals and determining the ultraviolet absorption. Whereas the starting material does not absorb light in the ultraviolet region of the spectrum to any appreciable extent, particularly at the range in which the product absorbs, the α,β-unsaturated ketone system of the product has a distinct absorption in the ultraviolet at a wave length of about 240 millimicrons. This difference in absorption can be utilized, under the conditions of the reaction, to determine the amount of α,β-unsaturated ketone present in the reaction mixture at any time in the course of the reaction. For example, a pure sample of cortisone acetate absorbs at a wave length of 239 millimicrons and has a molecular extinction coefficient of about 16,300. Samples of progressively lower degree of purity give a smaller molecular extinction coefficient. A direct relationship exists between the amount of cortisone acetate present in a given sample and the magnitude of the molecular extinction coefficient of the sample.

The mechanism of the reaction, and the intermediates involved, are not completely understood, and the invention is to be understood not to be limited by any theoretical explanation, but to be concerned solely with a novel method of dehydrohalogenating an α-haloketosteroid. It is, for example, believed that a complex between the metal halide and the solvent is formed, and that this complex is involved in the dehydrohalogenation. In one experiment (Example 19) such a complex was isolated and was successfully used to cause dehydrohalogenation.

Metal halides which are operative in the method of the present invention are the halides of "small ionic radius" metals. [For classification of elements in respect to ionic radii see A. F. Wells, "Structural Inorganic Chemistry," Oxford University Press, 1945, page 93, also Linus Pauling, "Nature of the Chemical Bond," Cornell University Press, Ithaca, N. Y., 1948, page 348.] The term "metal halides" as used in this specification and in the claims refers to the chlorides, bromides, and iodides of metals having an ionic radius of 0.20 Å. to 0.80 Å. inclusive, Å. being the usual abbreviation for Angstrom unit. For example, boron, beryllium, magnesium, and zinc have ionic radii of 0.20 Å., 0.31 Å., 0.65 Å., and 0.74 Å., respectively. Metal halides which are operative for the process of the present invention are, for example, lithium chloride, lithium bromide, lithium iodide, beryllium chloride, beryllium bromide, beryllium iodide, magnesium chloride, magnesium bromide, magnesium iodide, aluminum chloride, aluminum bromide, aluminum iodide, zinc chloride, silicon tetrachloride, titanium tetrachloride, boron trichloride, boron tribromide, and the like, with lithium chloride being preferred.

The solvent for the reaction is generally a basic organic solvent with a relatively high dielectric constant. Basic solvents, for the purpose of the present invention, are solvents which are basic according to the Lewis concept [see Organic Chemistry by Ray Q. Brewster, Prentice-Hall Inc., 1948, New York, page 58; also, W. F. Luder, J. Chem. Education, 25, 555 (1948)]. The Lewis concept designates compounds as being basic if they are electron donors (proton acceptors). The preferred solvents are nitrogen bases, especially those of the type

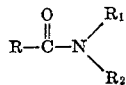

and

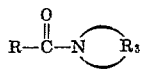

wherein R is hydrogen or a lower-alkyl radical such as, for example, methyl, ethyl, propyl, isopropyl, butyl, amyl, hexyl, heptyl, octyl, phenyl, and the like; $R_1$ and $R_2$ are either alike or different, and are lower alkyl radicals as defined for R; $R_3$ is a polymethylene chain containing four to five carbon atoms, which may be interrupted with other elements such as oxygen, nitrogen, and sulfur, and which may have substituents on the carbon chain. Tertiary amines with high dielectric constants may also be used as solvents and are equally operative. For example, representative bases which may be utilized as solvents include, N,N-dimethylformamide, N,N-dimethylacetamide, N,N-dimethylpropionamide, N,N-dimethylbutyramide, N,N-dimethylvaleramide, N,N-diethylcaproamide, N,N-dipropylcaprylamide, N-methyl-N-ethylformamide, N-propyl-N-butylacetamide, N-methyl-N-Octylpropionamide, N,N-dimethylbenzamide, N-cyclohexyl-N-methylformamide, N-methyl-N-phenylacetamide, N-ethyl-N-phenylbenzamide, benzoylmorpholine, acetylpyrrolidine, pyridine, collidine, lutidine, morpholine, α-pyridone, α-quinolone, or the like. The basic solvents are usually liquids and may be used alone or in combination with common organic solvents. If the basic solvent is a solid, an auxiliary solvent which is non-reactive under the conditions of the reaction such as, for example, benzene, toluene, butanol, or the like, is employed.

The following examples are illustrative of the present invention, but are not to be construed as limiting.

PREPARATION 1.—4-CHLORO-17α-HYDROXY-21-ACETOXYPREGNANE-3,11,20-TRIONE

To two grams of 3α,17α-dihydroxy-21-acetoxypregnane-11,20-dione [prepared from 3α,17α-dihydroxypregnane-11,20-dione (Sarett, J. Am. Chem. Soc., 70, 1454 (1949)) by bromination in the 21-position using bromine in chloroform at forty degrees centigrade and subsequent replacement of the 21-bromine atom with an acetate by reaction with potassium acetate in refluxing acetone] dissolved in 96 milliliters of tertiary butyl alcohol and three milliliters of water, was added 1.64 grams (12.3 millimoles) of N-chlorosuccinimide. The mixture was allowed to stand for one and one-half days at room temperature. Crystallization took place and the resulting crystalline product was filtered off, washed with tertiary butyl alcohol, and dried. The yield was 1.125 grams (52.1 per cent) of 4-chloro-17α-hydroxy-21-acetoxypregnane-3,11,20-trione, having a melting point of 239 to 243 degrees centigrade; $[\alpha]_D^{24}$ plus 100 degrees (acetone).

Analysis.—Per cent calculated for $C_{23}H_{31}O_6Cl$: C, 62.8; H, 7.11; Cl, 8.07. Found: C, 62.86; H, 7.36; Cl, 9.32.

According to the procedure given above other 21-acyloxy-4-chloro-17α-hydroxypregnane-3,11,20-triones are prepared from the corresponding 3α,17α-dihydroxy-21-acyloxypregnane-11,20-diones, which in turn are prepared according to the procedure given in Preparation 1 using various alkali-metal acylates, including 21-propionoxy-4-chloro-17α-hydroxypregnane-3,11,20-trione, 21-formoxy-4-chloro-17α-hydroxypregnane-3,11,20-trione, 21-isopropionoxy-4-chloro-17α-hydroxypregnane-3,11,20-trione, 21-butyroyloxy-4-chloro-17α-hydroxypregnane-3,11,20-trione, 21-valeroyloxy-4-chloro-17α-hydroxypregnane-3,11,20-trione, 21-hexanoyloxy-4-chloro-17α-hydroxypregnane-3,11,20-trione, 21-heptanoyloxy-4-chloro-17α-hydroxypregnane-3,11,20-trione, 21-(β-cyclopentylpropionoxy)-4-chloro-17α-hydroxypregnane-3,11,20-trione, 21-trimethylacetoxy-4-chloro-17α-hydroxypregnane-3,11,20-trione, and the like. The corresponding 4-bromo compounds are prepared in the manner of Preparation 1 using N-bromosuccinimide instead of N-chlorosuccinimide.

Example 1.—Cortisone acetate (using lithium chloride in dimethylformamide)

A solution of 1.93 grams (4.0 millimoles) of 4-bromo-17α-hydroxy-21-acetoxypregnane-3,11,20-trione prepared as described in U. S. Patent No. 2,541,104, issued February 13, 1951) and 0.51 gram (12 millimoles) of anhydrous lithium chloride in twenty milliliters of dimethylformamide was heated under atmosphere of nitrogen for two hours at 100 degrees centigrade. The hot reaction solution was then diluted with ten milliliters of water and the mixture was allowed to cool slowly to ice temperature. Fine needle-like crystals of cortisone acetate formed and were removed by filtration, washed with water and dried. The yield was 1.35 grams (84 per cent) of melting point 227 to 232 degrees centigrade. Recrystallization from an acetone-ether mixture raised the melting point to 248 to 250 degrees centigrade; $[\alpha]_D^{24}$ plus 179 degrees (acetone).

Example 2.—Cortisone acetate (using lithium chloride in dimethylformamide)

A solution of one gram of 4-bromo-17α-hydroxy-21-acetoxypregnane-3,11,20-trione and 0.5 gram of lithium chloride in ten milliliters of dimethylformamide was heated for thirty minutes at a temperature of 95 to 100 degrees centigrade. Dilution of the solution with thirty milliliters of hot water resulted in precipitation of a white solid, which on recrystallization from a mixture of acetone and petroleum ether yielded 0.43 gram (52.0 per cent) of cortisone acetate; melting point, 240 to 244 degrees centigrade; $[\alpha]_D^{24}$ plus 164 degrees (acetone).

Example 3.—Cortisone acetate (using lithium chloride in pyridine)

A solution of 0.97 gram (2.0 millimoles) of 4-bromo-17α-hydroxy-21-acetoxypregnane-3,11,20-trione and 0.25 gram (6.0 millimoles) of anhydrous lithium chloride in 7.5 milliliters of pyridine was heated for two hours at a temperature of 100 degrees centigrade. Dilution of the reaction mixture with thirty milliliters of water resulted in the precipitation of 0.30 gram of cortisone acetate; melting point, 244 to 247 degrees centigrade; $[\alpha]_D^{24}$ plus 180 degrees (acetone). The mother liquor was extracted with chloroform and the chloroform solution, after washing with dilute hydrochloric acid and water, was dried and evaporated to dryness. Crystallization of the residue yielded an additional 0.33 gram of cortisone acetate; melting point, 245 to 248 degrees centigrade; $[\alpha]_D^{24}$ plus 177 degrees (acetone). The total yield was 79 per cent.

*Example 4.—Cortisone acetate (using lithium chloride in dimethylacetamide)*

A solution of 0.97 gram (2.0 millimoles) of 4-bromo-17α - hydroxy - 21 - acetoxypregnane - 3,11,20 - trione and 0.25 gram (6.0 millimoles) of anhydrous lithium chloride in ten milliliters of N,N-dimethylacetamide was heated for two hours at 100 degrees centigrade. Dilution of the reaction mixture with water yielded 0.73 gram (90.7 per cent) of crude cortisone acetate, which on recrystallization from acetone-ether (2:1) resulted in a 69.6 per cent yield of purified cortisone acetate; melting point, 245 to 248 degrees centigrade; $[\alpha]_D^{24}$ plus 183 degrees (acetone).

*Example 5.—Cortisone acetate (using lithium bromide in N-formylpiperidine)*

A solution of 0.48 gram (1.0 millimole) of 4-bromo-17α - hydroxy - 21 - acetoxypregnane - 3,11,20 - trione and 0.43 gram (5.0 millimoles) of anhydrous lithium bromide in seven milliliters of N-formylpiperidine was heated for two hours at 100 degrees centigrade under an atmosphere of nitrogen. Dilution of the reaction mixture with fifteen milliliters of water and cooling caused crystallization of 0.33 gram (82 per cent) of crude cortisone acetate; melting point, 213 to 218 degrees centigrade; $[\alpha]_D^{24}$ plus 158 degrees (acetone).

*Example 6.—Cortisone acetate (from 4-chloro-17α-hydroxy - 21 - acetoxypregnane - 3,11,20 - trione using lithium iodide in dimethylformamide)*

A solution of 1.32 grams (3.0 millimoles) of 4-chloro-17α - hydroxy - 21 - acetoxypregnane - 3,11,20 - trione and 1.20 grams (9.0 millimoles) of anhydrous lithium iodide in fifteen milliliters of dimethylformamide was heated at 100 degrees centigrade for three hours under an atmosphere of nitrogen. At the end of this time the red solution was diluted with five milliliters of five per cent sodium bisulfite solution and fifty milliliters of water. The colorless aqueous solution was extracted with two fifty-milliliter portions of chloroform and concentrated to dryness under reduced pressure. Ultraviolet absorption spectra analysis of the residue showed that the yield of cortisone acetate was approximately 21 per cent.

*Example 7.—Cortisone acetate (from 4-chloro-17α-hydroxy - 21 - acetoxypregnane - 3,11,20 - trione using lithium bromide in dimethylacetamide)*

A solution of 454 milligrams (1.03 millimoles) of 4-chloro - 17α - hydroxy - 21 - acetoxypregnane - 3,11,20-trione and 272 milligrams (3.1 millimoles) of anhydrous lithium bromide in ten milliliters of N,N-dimethylacetamide was heated for three hours at 130 to 135 degrees centigrade under an atmosphere of nitrogen. Dilution of the reaction mixture with forty milliliters of water caused precipitation of 360 milligrams (86.5 per cent) of crude cortisone acetate; melting point, 222 to 230 degrees centigrade; $[\alpha]_D^{24}$ plus 178 degrees (acetone).

Similar results are obtained when lithium chloride in dimethylformamide is used in place of lithium bromide in dimethylacetamide.

*Example 8.—Cortisone acetate (using magnesium chloride in dimethylformamide)*

A solution of 1.21 grams (2.5 millimoles) of 4-bromo-17α - hydroxy - 21 - acetoxypregnane - 3,11,20 - trione and 0.95 gram (10 millimoles) of anhydrous magnesium chloride in ten milliliters of dimethylformamide was heated at 95 to 100 degrees centigrade for two hours under an atmosphere of nitrogen. Dilution of the reaction mixture with thirty milliliters of water and cooling to ice temperature caused precipitation of 0.94 gram of solid which on recrystallization gave two crops of cortisone acetate: (1) from acetone, 0.51 gram (51 per cent); melting point, 246 to 249 degrees centigrade; $[\alpha]_D^{24}$ plus 182 degrees (acetone); (2) from acetone-ether, 0.09 gram (9 per cent); melting point, 236 to 242 degrees centigrade; $[\alpha]_D^{24}$ plus 178 degrees (acetone).

*Example 9.—Cortisone acetate (using beryllium chloride in dimethylformamide)*

A solution of 1.21 grams (2.5 millimoles) of 4-bromo-17α - hydroxy - 21 - acetoxypregnane - 3,11,20 - trione and 1.0 gram (12.5 millimoles) of beryllium chloride in ten milliliters of dimethylformamide was heated for two hours at 95 to 100 degrees centigrade under an atmosphere of nitrogen. Dilution of the reaction mixture with thirty milliliters of water and cooling to ice temperature caused precipitation of 0.96 gram of solid which on recrystallization from acetone gave two crops of cortisone acetate: (1) 0.5 gram (50 per cent); melting point, 246 to 249 degrees centigrade; $[\alpha]_D^{24}$ plus 181 degrees (acetone); (2) 0.15 gram (15 per cent); melting point 230 to 237 degrees centigrade; $[\alpha]_D^{24}$ plus 171 degrees (acetone).

*Example 10.—Cortisone acetate (using aluminum chloride in dimethylformamide)*

A solution of 483 milligrams (1.0 millimole) of 4-bromo - 17α - hydroxy - 21 - acetoxypregnane - 3,11,20-trione and 200 milligrams (3.0 millimoles) of anhydrous aluminum chloride in five milliliters of diemethylformamide was heated under an atmosphere of nitrogen for one hour at a temperature of 95 to 100 degrees centigrade. Dilution of the solution with twenty milliliters of water resulted in precipitation of a white solid, which on trituration with a mixture of three milliliters of acetone and three milliliters of ether yielded 228 milligrams (56.7 per cent) of cortisone acetate; melting point, 227 to 231 degrees centigrade; $[\alpha]_D^{24}$ plus 159 degrees (acetone).

*Example 11.—Cortisone acetate (using para-toluenesulfonic acide as catalyst)*

A solution of 500 milligrams (1.03 millimoles) of 4-bromo - 17α - hydroxy - 21 - acetoxypregnane - 3,11,20-trione, 134 milligrams (3.1 millimoles) of anhydrous lithium chloride, and fifty milligrams of para-toluenesulfonic acid in ten milliliters of dimethylformamide was heated for six hours at sixty degrees centigrade. Ultraviolet absorption analysis of the reaction mixture showed a 90 per cent yield of cortisone acetate.

According to the procedure given in the above examples, other esters of cortisone are prepared from the appropriate 4-bromo or 4-chloro-17α-hydroxy-21-acyloxypregnane-3,11,20-trione, including cortisone propionate, cortisone formate, cortisone butyrate, cortisone valerate, cortisone hexanoate, cortisone heptanoate, cortisone β-cyclopentylpropionate, cortisone trimethylacetate, and the like.

*Example 12.—Cortisone acetate (from 17α-hydroxy-21-acetoxyallopregnane-3,11,20-trione)*

17α - hydroxy - 21 - acetoxyallopregnane - 3,11,20-trione (1.01 grams) was dibrominated according to the method of Rosenkranz, Djerassi, Yashin and Pataki as described in Nature, 168, 28 (July 7, 1951) and yielded 1.21 grams of product. Treatment of 1.0 gram of this material with 1.0 gram of lithium chloride in ten milliliters of dimethylformamide at 100 degrees centigrade for two hours yielded 420 milligrams of crystalline material which still contained halogen. Reduction of 390 milligrams of this material with sodium bisulfite in aqueous dioxane yielded 55 milligrams of crystalline material free of halogen which consisted of 35–40 per cent of cortisone acetate as shown by ultraviolet absorption analysis.

*Example 13.—11-ketoprogesterone*

A solution of 0.8 gram (5.0 millimoles) of bromine in eight milliliters of dimethylformamide was added dropwise to a solution of 1.65 grams (5.0 millimoles) of pregnane-3,11,20-trione [Reichstein and Fuchs) Helv. Chim. Acta, 26, 721 (1945)] and thirty milligrams of para-toluenesulfonic acid monohydrate in eight milliliters of dimethylformamide. The bromination was allowed to proceed at room temperature and required approximately four hours for completion. The reaction mixture was then diluted with 100 milliliters of chloroform and the resulting solution was washed with four 25-milliliter portions of water and concentrated to dryness under reduced pressure. The solid residue (2.0 grams) was dissolved, together with 0.64 gram (15 millimoles) of anhydrous lithium chloride, in 10 milliliters of dimethylformamide and the solution was heated for two hours at a temperature of 100 degrees centigrade. The reaction mixture was then diluted with 100 milliliters of chloroform, the solution washed with four 25-milliliter portions of water, and concentrated to dryness under reduced pressure. The residue (1.71 grams) was crystallized from ten milliliters of ether and yielded 0.58 gram of crystalline material; melting point 140 to 146 degrees centigrade. Ultraviolet absorption spectrum analysis and paper chromatography showed that at least half of this material was 11-ketoprogesterone. A second crop of 0.11 gram; melting point 145 to 152 degrees centigrade, and the final residue (0.99 gram) consisted of a mixture (1:1) of 11-ketoprogesterone and pregnane-3,11,20-trione (starting material) as shown by ultraviolet absorption analysis and paper chromatography.

Example 14.—Progesterone

Following the procedure given in Example 13, progesterone is prepared from pregnane-3,20-dione by bromination with bromine and removal of hydrogen bromide with lithium chloride in dimethylformamide.

Example 15.—$\Delta^1$-cholestenone

Following the procedure given in the above examples, 2-bromocholestanone [prepared as described by Butenandt et al., Ber., 72, 1617 (1939)] is converted to $\Delta^1$-cholestenone by reaction with lithium chloride in collidine.

Example 16.—$\Delta^5$-7-ketocholenic acid

Following the procedure given in the above examples, 6-bromo-7-ketocholanic acid [prepared as described by Wieland and Dane, Z. Physiol. Chem. 210, 268 (1932)] is converted to $\Delta^5$-7-ketocholenic acid by reaction with titanium tetrachloride in N,N-dimethylpropionamide.

Example 17.—$\Delta^{9(11)}$-3$\alpha$-acetoxy-12-ketocholenic acid

Following the procedure given in the above examples, 3$\alpha$ - acetoxy - 11 - bromo - 12 - ketocholanic acid [prepared as described by Hicks, Berg, and Wallis in J. Biol. Chem., 162, 633 (1946)] is converted to $\Delta^{9(11)}$-3$\alpha$-acetoxy-12-ketocholenic acid by reaction with magnesium bromide in morpholine.

Example 18.—Cortisone acetate (time-temperature study)

4 - bromo - 17$\alpha$ - hydroxy - 21 - acetoxypregnane - 3,11,20-trione and three molar proportions of lithium chloride were heated together in dimethylformamide solution. Aliquots were removed at various time intervals and the cortisone acetate content was determined by ultraviolet absorption analysis. The following table gives per cent yield of cortisone acetate at different time-temperature points.

| Temp., (° C.) | Time (hours) | | | | | |
|---|---|---|---|---|---|---|
| | 0 | .5 | 1.0 | 2.0 | 3.0 | 5.0 |
| 50 | 0 | 2.0 | 4.0 | 4.0 | 19.6 | 79.1 |
| 60 | 0 | 1.6 | 4.9 | 50.8 | 70.8 | 68.4 |
| 70 | 0 | 17.1 | 69.6 | 76.2 | 81.0 | |
| 100 | 0 | 58.5 | 62.5 | 69.5 | 76.0 | |

Example 19.—Lithium iodide-dimethylformamide complex

A solution of 10.6 grams (0.25 mole) of anhydrous lithium chloride in 100 milliliters of dimethylformamide was admixed with a solution of 37.5 grams (0.25 mole) of sodium iodide in 150 milliliters of dimethylformamide at a temperature of eighty to ninety degrees centigrade. A precipitate of sodium chloride formed immediately and was removed by filtration. The filtrate, which was concentrated to 100 milliliters under reduced pressure, solidified on cooling. The crystalline solid was recrystallized twice from 150 milliliters of ethyl acetate and yielded 35.2 grams of lithium iodide-dimethylformamide complex.

*Analysis.*—Per cent calculated for LiI·C$_3$H$_7$NO: I, 61.33; N, 6.77. Found: I, 62.71; N, 6.72.

When 4 - bromo - 17$\alpha$ - hydroxy - 21 - acetoxypregnane-3,11,20-trione was treated with the complex in dimethylformamide at 100 degrees centigrade for two hours, 14.3 per cent cortisone acetate was obtained.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A process for the introduction of a double bond between carbon atoms vicinal to a ketone group in ketosteroids which comprises reacting a ketosteroid, having a halogen of atomic weight from 35 to 80 on the carbon atom alpha to the ketone group and a hydrogen on the next adjacent carbon, with a halide of a metal having an ionic radius of 0.20 Å. to 0.80 Å., inclusive, in a basic organic solvent, to form an $\alpha,\beta$-unsaturated ketosteroid.

2. A process for the introduction of a 4(5)-double bond into a steroid by removal of hydrogen halide from a 3-keto-4-halosteroid which comprises reacting a 3-keto-4-halosteroid, wherein the halogen is selected from the group consisting of chlorine and bromine, with a halide of a metal having an ionic radius of 0.20 Å. to 0.80 Å., inclusive, in a nitrogen base solvent, and separating the $\Delta^4$-3-ketosteroid thus formed.

3. A process for the introduction of a 4(5)-double bond into a pregnane by removal of hydrogen halide from a 3-keto-4-halopregnane which comprises reacting a 3-keto-4-halopregnane, wherein the halogen is selected from the group consisting of chlorine and bromine, with a halide of a metal having an ionic radius of 0.20 Å. to 0.80 Å., inclusive, in a nitrogen base solvent, and separating the $\Delta^4$-3-ketopregnene thus formed.

4. A process for the introduction of a 4(5)-double bond into a pregnane by removal of hydrogen halide from a 3-keto-4-halopregnane which comprises reacting a 3-keto-4-halopregnane, wherein the halogen is selected from the group consisting of chlorine and bromine, with a halide of a metal having an ionic radius of 0.20Å. to 0.80 Å., inclusive, in a nitrogen base solvent, and in the presence of an acid catalyst, and separating the $\Delta^4$-3-ketopregnene thus formed.

5. A process for the introduction of a 4(5)-double bond into a pregnane by removal of hydrogen halide from a 3-keto-4-halopregnane which comprises reacting a 3-keto-4-halopregnane, wherein the halogen is selected from the group consisting of chlorine and bromine, with a halide of a metal having an ionic radius of 0.20 Å. to 0.80 Å., inclusive, in a nitrogen base solvent, and in the presence of para-toluenesulfonic acid, and separating the $\Delta^4$-3-ketopregnene thus formed.

6. A process for the introduction of a 4(5)-double bond into a pregnane by removal of hydrogen halide from a 3-keto-4-halopregnane which comprises reacting a 3-keto-4-halopregnane, wherein the halogen is selected from the group consisting of chlorine and bromine, with lithium chloride, in a nitrogen base solvent, and separating the $\Delta^4$-3-ketopregnene thus formed.

7. A process for the introduction of a 4(5)-double bond into a pregnane by removal of hydrogen halide from a 3-keto-4-halopregnane which comprises reacting a 3-keto-4-halopregnane, wherein the halogen is selected from the group consisting of chlorine and bromine, with magnesium chloride, in a nitrogen base solvent, and separating the $\Delta^4$-3-ketopregnene thus formed.

8. A process for the introduction of a 4(5)-double bond into a pregnane by removal of hydrogen halide from a 3-keto-4-halopregnane which comprises reacting a 3-keto-4-halopregnane, wherein the halogen is selected from the group consisting of chlorine and bromine, with aluminum chloride, in a nitrogen base solvent, and separating the $\Delta^4$-3-ketopregnene thus formed.

9. A process for the production of a cortisone acylate which comprises reacting 4-bromo-17$\alpha$-hydroxy-21-acyloxypregnane-3,11,20-trione with lithium chloride in a nitrogen base solvent, and separating the cortisone acylate thus produced.

10. A process for the production of a cortisone acylate which comprises reacting 4-bromo-17$\alpha$-hydroxy-21-acyloxypregnane-3,11,20-trione with magnesium chloride in a nitrogen base solvent, and separating the cortisone acylate thus produced.

11. A process for the production of a cortisone acylate which comprises reacting 4-bromo-17$\alpha$-hydroxy-21-acyloxypregnane-3,11,20-trione with aluminum chloride in a nitrogen base solvent, and separating the cortisone acylate thus produced.

12. A process for the production of a cortisone acylate which comprises reacting 4-chloro-17α-hydroxy-21-acetoxypregnane-3,11,20-trione with lithium chloride in a nitrogen base solvent, and separating the cortisone acetate thus produced.

13. A process for the introduction of a 4(5)-double bond into a pregnane by removal of hydrogen halide from a 3-keto-4-halopregnane which comprises reacting a 3-keto-4-halopregnane, wherein the halogen is selected from the group consisting of chlorine and bromine, with a halide of a metal having an ionic radius of 0.20 Å. to 0.80 Å., inclusive, in dimethylformamide solvent, and separating the $\Delta^4$-3-ketopregnene thus formed.

14. A process for the introduction of a 4(5)-double bond into a pregnane by removal of hydrogen halide from a 3-keto-4-halopregnane which comprises reacting a 3-keto-4-halopregnane, wherein the halogen is selected from the group consisting of chlorine and bromine, with lithium chloride, in dimethylformamide solvent, and separating the $\Delta^4$-3-ketopregnene thus formed.

15. A process for the production of cortisone acetate which comprises reacting 4-bromo-17α-hydroxy-21-acetoxypregnane-3,11,20-trione with lithium chloride in dimethylformamide solvent, and separating the cortisone acetate thus produced.

16. A process for the production of cortisone acetate which comprises reacting 4-bromo-17α-hydroxy-21-acetoxypregnane-3,11,20-trione with magnesium chloride in dimethylformamide solvent, and separating the cortisone acetate thus produced.

17. A process for the production of cortisone acetate which comprises reacting 4-bromo-17α-hydroxy-21-acetoxypregnane-3,11,20-trione with aluminum chloride in dimethylformamide solvent, and separating the cortisone acetate thus produced.

18. A process for the production of cortisone acetate which comprises reacting 4-chloro-17α-hydroxy-21-acetoxypregnane-3,11,20-trione with lithium chloride in dimethylformamide solvent, and separating the cortisone acetate thus produced.

19. A process for the introduction of a 4(5)-double bond into a steroid by removal of hydrogen halide from a 3-keto-4-halosteroid which comprises reacting a 3-keto-4-halosteroid, wherein the halogen is selected from the group consisting of chlorine and bromine, with the organic complex formed between a halide of a metal having an ionic radius of 0.20 Å. to 0.80 Å., inclusive, and a nitrogen base solvent, and separating the $\Delta^4$-3-ketosteroid thus formed.

References Cited in the file of this patent

Dane et al.: Zeit. Physiol. Chem. 245, pp. 80–88 (1936).